(12) United States Patent
House

(10) Patent No.: US 10,688,962 B2
(45) Date of Patent: Jun. 23, 2020

(54) REMOTE VEHICLE CONTROL SYSTEM

(71) Applicant: Anthony House, Delray Beach, FL (US)

(72) Inventor: Anthony House, Delray Beach, FL (US)

( * ) Notice: Subject to any disclaimer, the term of this patent is extended or adjusted under 35 U.S.C. 154(b) by 308 days.

(21) Appl. No.: 15/791,960

(22) Filed: Oct. 24, 2017

(65) Prior Publication Data

US 2019/0118765 A1   Apr. 25, 2019

(51) Int. Cl.
*G04B 47/00* (2006.01)
*B60R 25/102* (2013.01)
*G04G 9/00* (2006.01)

(52) U.S. Cl.
CPC ............ *B60R 25/102* (2013.01); *G04B 47/00* (2013.01); *G04G 9/0064* (2013.01); *B60R 2325/20* (2013.01)

(58) Field of Classification Search
CPC .... G04B 17/325; G04B 17/066; G04B 17/26; G04B 18/02; B60R 25/102; B60R 2325/20
See application file for complete search history.

(56) References Cited

U.S. PATENT DOCUMENTS

| | | | |
|---|---|---|---|
| 6,282,152 B1 * | 8/2001 | Kurple | G04G 9/0064 340/12.28 |
| 6,580,541 B1 | 6/2003 | Yamashita et al. | |
| D638,324 S | 5/2011 | Tang | |
| 8,983,534 B2 | 3/2015 | Patel | |
| 9,076,324 B2 | 7/2015 | Yashiro et al. | |
| 9,230,425 B2 | 1/2016 | Hamaue et al. | |
| 9,703,368 B2 * | 7/2017 | Cho | H04M 1/7253 |
| 9,744,943 B1 * | 8/2017 | Hiatt | B60R 25/04 |
| 9,869,556 B2 * | 1/2018 | Jung | G01C 21/3632 |
| 2010/0128570 A1 * | 5/2010 | Smith | G04G 21/04 368/10 |
| 2014/0330453 A1 | 11/2014 | Nakagawa | |
| 2015/0357948 A1 | 12/2015 | Goldstein | |
| 2016/0061588 A1 * | 3/2016 | Cho | H04M 1/7253 356/614 |
| 2016/0061613 A1 * | 3/2016 | Jung | G01C 21/3632 701/49 |
| 2016/0252978 A1 * | 9/2016 | Yoo | H04M 1/7253 345/184 |
| 2018/0013947 A1 * | 1/2018 | Kim | G06F 13/14 |

* cited by examiner

*Primary Examiner* — Sean Kayes

(57) ABSTRACT

A remote vehicle control system includes a vehicle that has a diagnostic system, electric door locks, an electric trunk release, a theft alarm and a first transceiver. A watch is provided and the watch may be worn on a wrist thereby facilitating the watch to display a time of day and a date. A communication unit is coupled to the watch. The communication unit is in electrical communication with the diagnostic unit to notify a user of diagnostic alerts generated by the diagnostic unit. The communication unit controls operational parameters of the electric door locks, the electric trunk release and the theft alarm.

13 Claims, 4 Drawing Sheets

REMOTE VEHICLE CONTROL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to remote control devices and more particularly pertains to a new remote control device for remotely controlling a vehicle and receiving diagnostic alerts from the vehicle.

BRIEF SUMMARY OF THE INVENTION

An embodiment of the disclosure meets the needs presented above by generally comprising a vehicle that has a diagnostic system, electric door locks, an electric trunk release, a theft alarm and a first transceiver. A watch is provided and the watch may be worn on a wrist thereby facilitating the watch to display a time of day and a date. A communication unit is coupled to the watch. The communication unit is in electrical communication with the diagnostic unit to notify a user of diagnostic alerts generated by the diagnostic unit. The communication unit controls operational parameters of the electric door locks, the electric trunk release and the theft alarm.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
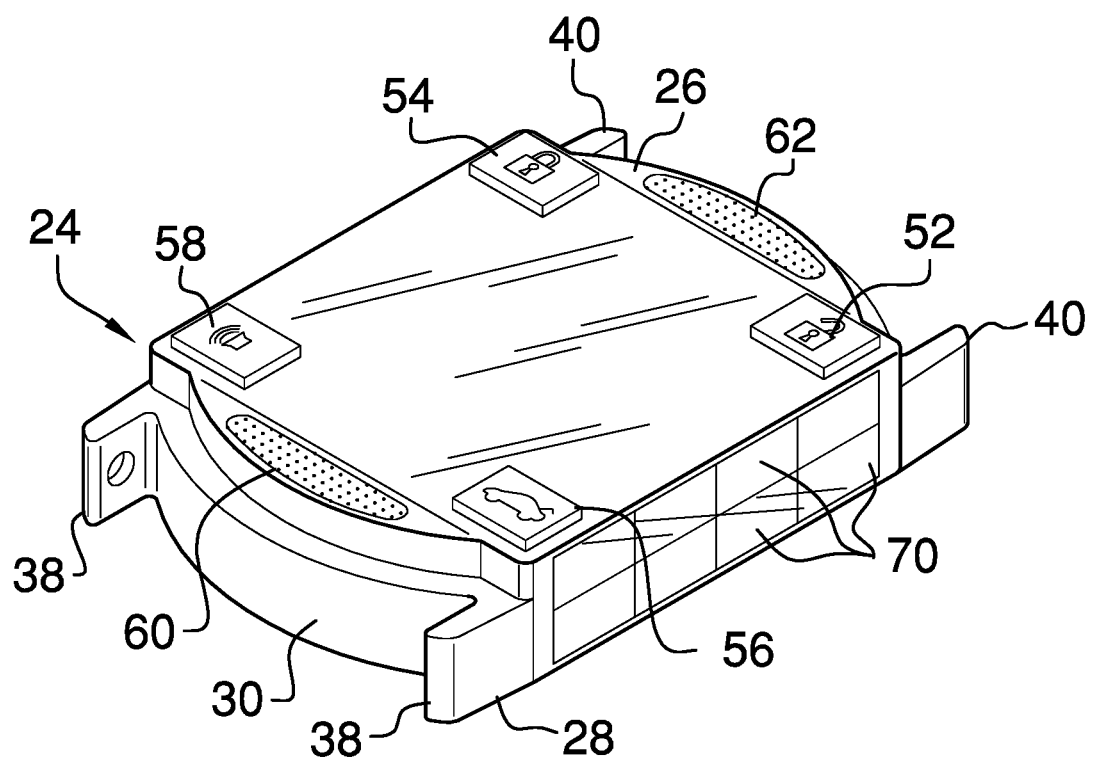
FIG. 1 is a top perspective view of a watch of a remote vehicle control system according to an embodiment of the disclosure.
Figure 2:
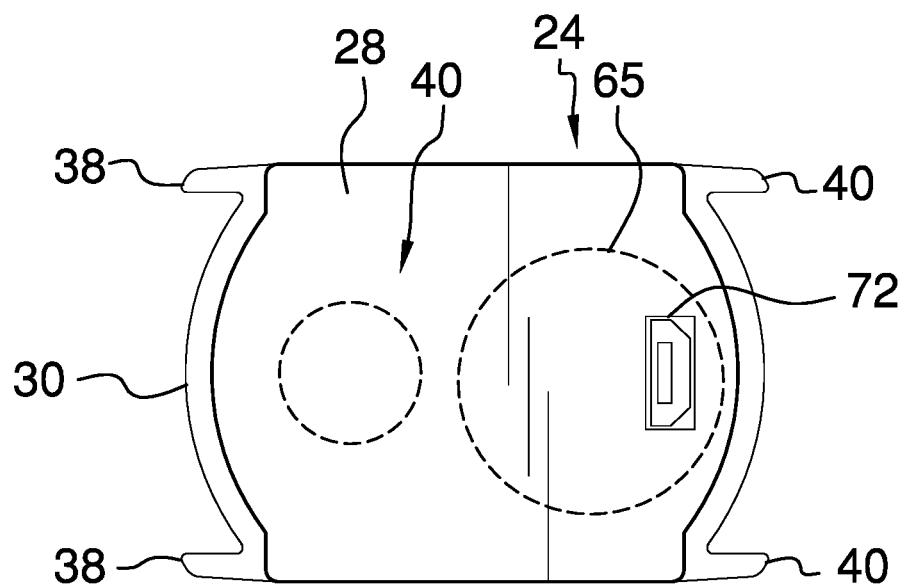
FIG. 2 is a bottom phantom view of an embodiment of the disclosure.
Figure 3:
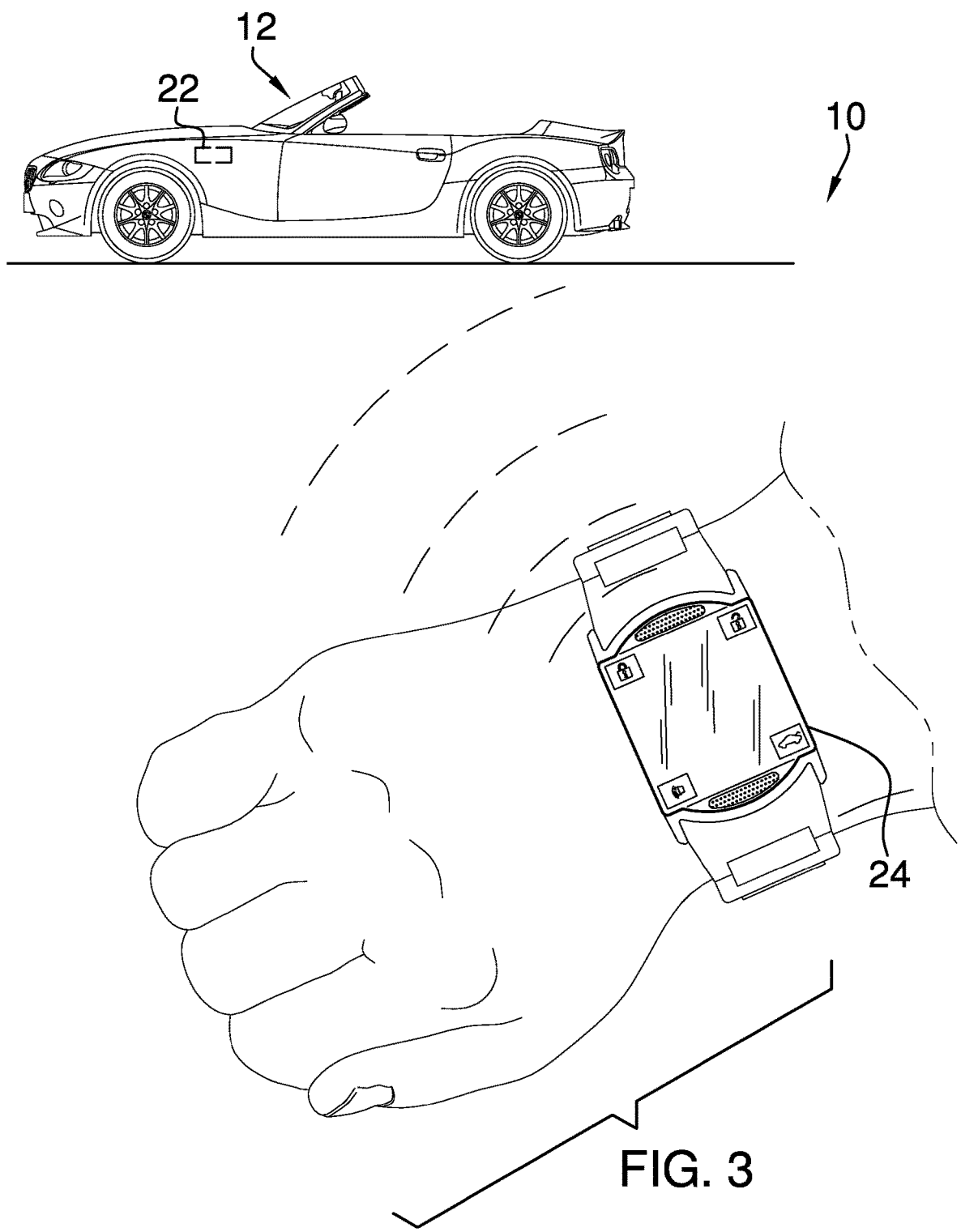
FIG. 3 is a perspective in-use view of an embodiment of the disclosure.
Figure 4:
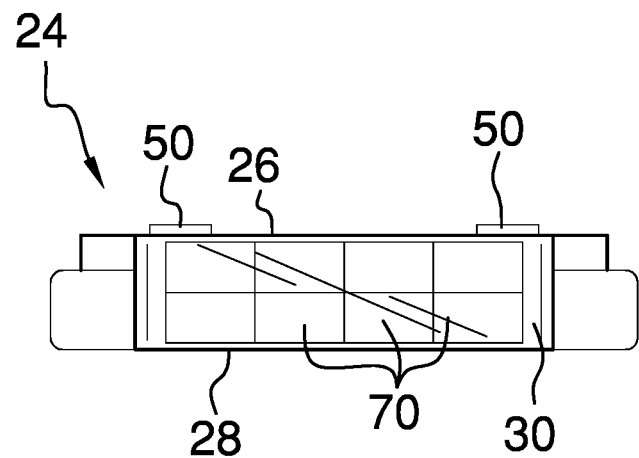
FIG. 4 is a right side view of an embodiment of the disclosure.
Figure 5:
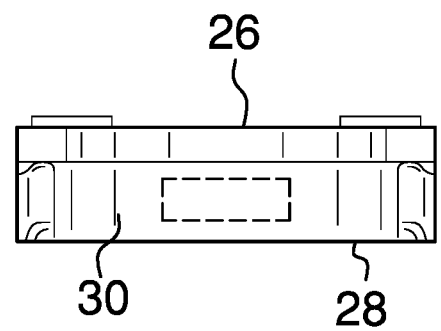
FIG. 5 is a front phantom view of an embodiment of the disclosure.
Figure 6:
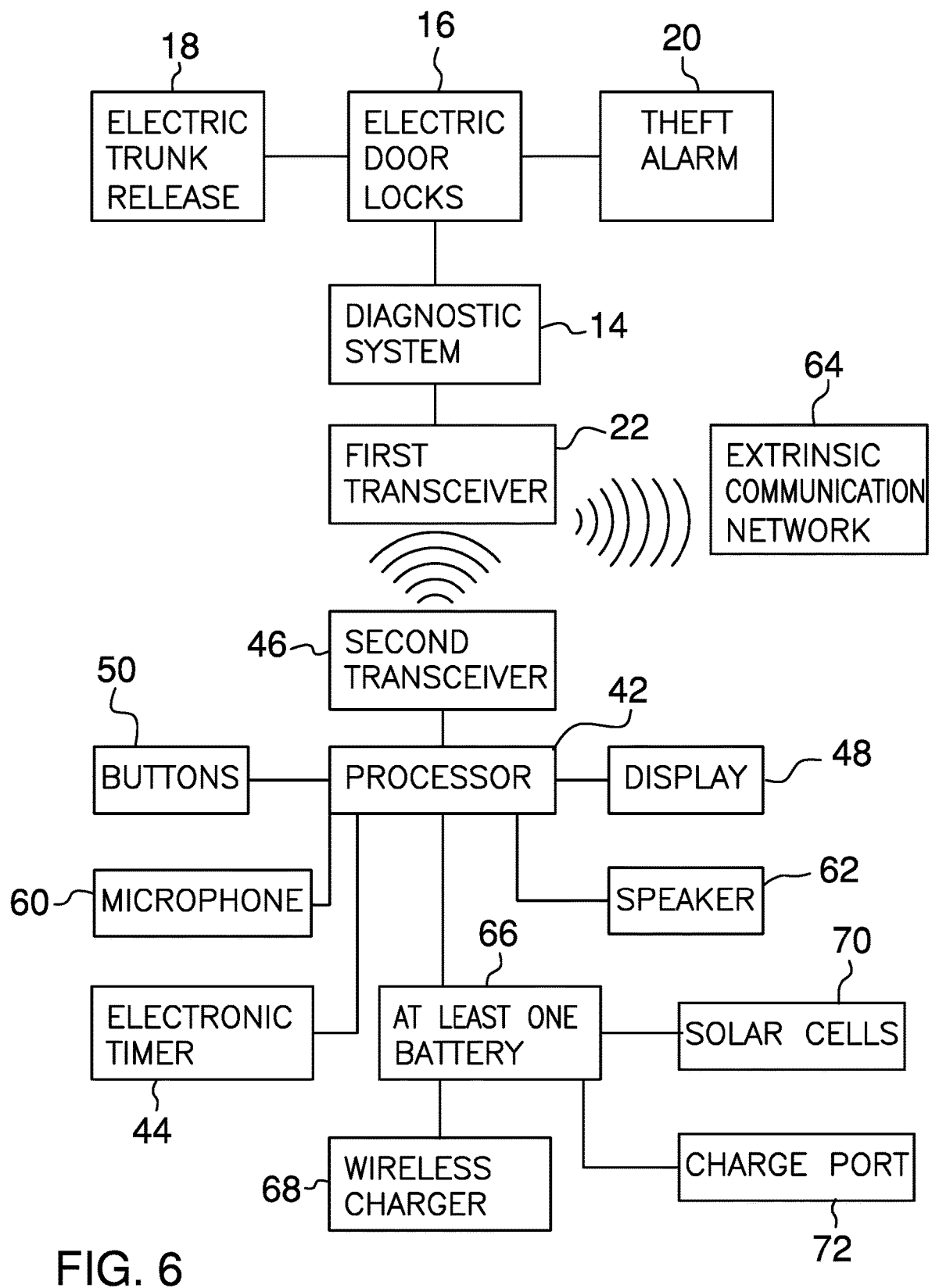
FIG. 6 is a schematic view of an embodiment of the disclosure.

With reference now to the drawings, and in particular to FIGS. 1 through 6 thereof, a new remote control device embodying the principles and concepts of an embodiment of the disclosure and generally designated by the reference numeral 10 will be described.

As best illustrated in FIGS. 1 through 6, the remote vehicle control system 10 generally comprises a vehicle 12 that has a diagnostic system 14, electric door locks 16, an electric trunk release 18, a theft alarm 20 and a first transceiver 22. The vehicle 12 may be a passenger vehicle 12 such as a car, a pickup, a cargo vehicle 12 such as a semi truck and any other type of motorized vehicle 12. A watch 24 is provided that is worn on a wrist thereby facilitating the watch 24 to display a time of day and a date. The watch 24 may be a digital watch or the like and the watch 24 is in wireless communication with the vehicle 12. In this way the watch 24 remotely controls operational parameters corresponding to each of the diagnostic system 14, the electric door locks 16, the electric trunk release 18 and the theft alarm 20.

The watch 24 has a top side 26, a bottom side 28 and a peripheral edge 30 extending therebetween. The peripheral edge 30 has a front side 32 and a back side 34, the front side 32 has a pair of first tabs 36 extending outwardly therefrom. The first tabs 36 are spaced apart from each other. The back side 34 has a pair of second tabs 38 extending outwardly therefrom and the second tabs 38 are spaced apart from each other. Each of the first tabs 36 movably engages a first end of a wrist band. Each of the second tabs 38 movably engages a second end of a wrist band thereby facilitating the wrist band to retain the watch 24 on the wrist.

A communication unit 40 is provided and the communication unit 40 is coupled to the watch 24. Moreover, the communication unit 40 is in electrical communication with the diagnostic system 14. In this way the communication unit 40 may notify a user of diagnostic alerts generated by the diagnostic system 14. Additionally, the communication unit 40 controls operational parameters of the electric door locks 16, the electric trunk release 18 and the theft alarm 20.

The communication unit 40 comprises a processor 42 that is positioned within the watch 24. An electronic timer 44 is positioned within the watch 24 and the electronic timer 44 is electrically coupled to the processor 42. The electronic timer 44 tracks a time of day and a calendar date in the convention of digital watches. A second transceiver 46 is positioned within the watch 24 and the second transceiver 46 is electrically coupled to the processor 42. The second transceiver 46 is in electrical communication with the first transceiver 22.

A display 48 is coupled to the top side 26 of the watch 24 such that the display 48 is visible to the user. The display 48 is electrically coupled to the processor 42 and the display 48 displays indicia corresponding to the diagnostic alerts received from the diagnostic system 14. Additionally, the display 48 displays indicia corresponding to the time of day and the calendar date from the electronic timer 44. The display 48 may be an LCD display 48 or the like.

A plurality of buttons 50 is provided and each of the buttons 50 is movably coupled to the watch 24. Each of the buttons 50 is electrically coupled to the processor 42. The plurality of buttons 50 may include, but not be limited to, a door unlock button 52, a door lock button 54, a trunk release button 56 and an alarm button 58. The electric door locks 16 may unlock when the door unlock button 52 is depressed and the electric door locks 16 may lock when the door lock button 54 is depressed. The electric trunk release 18 may be actuated when the trunk release button 56 is depressed and the theft alarm 20 may be turned on and off when the alarm button 58 is depressed.

A microphone 60 is coupled to the watch 24 to record audible sounds. The microphone 60 is electrically coupled to the processor 42 such that the processor 42 responds to verbal commands. The microphone 60 may be an electronic microphone or the like and the microphone 60 may be positioned on the top side 26 of the watch 24. A speaker 62 is coupled to the watch 24 to selectively emit audible sound outwardly therefrom. The speaker 62 is electrically coupled to the processor 42 and the speaker 62 may be an electronic speaker 62 or the like.

The first transceiver 22 may be in wireless communication with an extrinsic communication network 64, such as OnStar or other roadside assistance network. The speaker 62 may emit audio corresponding to communication received from the extrinsic communication network 64. Additionally, the microphone 60 may facilitate verbal communication with support personnel or the like. Each of the door locks 16, the trunk release 18 and the theft alarm 20 may respond to verbal commands.

A power supply 65 is coupled to the watch 24 and the power supply 65 is electrically coupled to the processor 42. The power supply 65 comprises at least one battery 66 is positioned within the watch 24. The at least one battery 66 is electrically coupled to the processor 42. A wireless charger 68 is positioned within the watch 24. The wireless charger 68 is selectively placed in wireless electrical communication with a power source. In this way the at least one battery 66 may be wirelessly charged.

A plurality of solar cells 70 is provided and each of the solar cells 70 is coupled to the watch 24. Each of the solar cells 70 is exposed to sunlight and each of the solar cells 70 converts sunlight into electrical energy. Each of the solar cells 70 is electrically coupled to the at least one battery 66 to charge the at least one battery 66. A charge port 72 is coupled to the watch 24 and the charge port 72 is selectively electrically coupled to a power source. The charge port 72 is electrically coupled to the at least one battery 66 to charge the at least one battery 66. The charge port 72 may be a micro usb port or the like and the power source may be a micro usb cord.

In use, the watch 24 is worn and the buttons 50 are selectively manipulated to control the operational parameters of the electric door locks 16, trunk release 18 and the theft alarm 20. Additionally, verbal commands are selectively spoken into the microphone 60 to control the electric door locks 16, trunk release 18 and the theft alarm 20. The display 48 displays any diagnostic alerts that are generated by the diagnostic system 14. In this way the user is remotely notified of mechanical problems that need attention. Additionally, the user is remotely notified when the theft alarm 20 is turned on. The user may remotely communicate with roadside assistance through the speaker 62 and the microphone 60. Thus, the user does not need to be located near the vehicle 12 to communicate with the vehicle's service provider such as OnStar or the like.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A remote vehicle control system comprising:
   a vehicle having a diagnostic system, electric door locks, an electric trunk release, a theft alarm and a first transceiver;
   a watch being configured to be worn on a wrist thereby facilitating said watch to display a time of day and a date; and
   a communication unit being coupled to said watch, said communication unit being in electrical communication with said diagnostic unit wherein said communication unit is configured to notify a user of diagnostic alerts generated by said diagnostic unit, said communication unit controlling operational parameters of said electric door locks, said electric trunk release and said theft alarm, said communication unit comprising
      a processor being positioned within said watch,
      an electronic timer being positioned within said watch, said electronic timer being electrically coupled to said processor, said electronic timer tracking a time of day and a calendar date,
      a display being coupled to said top side of said watch wherein said display is configured to be visible to the user, said display being electrically coupled to said processor, said display displaying indicia corresponding to the time of day and the calendar date from said electronic timer, said display being rectangular having a planar surface having with corners, and a plurality of buttons, each of said buttons being movably coupled to said watch and positioned on said display adjacent to a respective one of said corners, each of said buttons being electrically coupled to said processor, said plurality of buttons including a door unlock button, a door lock button, a trunk release button and an alarm button, said electric door locks unlocking when said door unlock button is depressed, said electric door locks locking when said door lock button is depressed, said electric trunk release being actuated when said trunk release button is depressed, said theft alarm being turned on when said alarm button is depressed.

2. The system according to claim 1, wherein said watch has a top side, a bottom side and a peripheral edge extending therebetween, said peripheral edge having a front side and a back side, said front side having a pair of first tabs extending outwardly therefrom, said first tabs being spaced apart from each other.

3. The system according to claim 2, wherein said back side has a pair of second tabs extending outwardly therefrom said second tabs being spaced apart from each other, each of said first tabs being configured to engage a first end of a wrist band, each of said second tabs being configured to engage a second end of a wrist band thereby facilitating the wrist band to retain said watch on the wrist.

4. The system according to claim 1, further comprising a second transceiver being positioned within said watch, said second transceiver being electrically coupled to said processor, said second transceiver being in electrical communication with said first transceiver.

5. The system according to claim 1, further comprising said display displaying indicia corresponding to the diagnostic alerts received from said diagnostic unit.

6. The system according to claim 1, further comprising a microphone being coupled to said watch wherein said microphone is configured to record audible sounds, said microphone being electrically coupled to said processor such that said processor responds to verbal commands.

7. The system according to claim 1, further comprising a speaker being coupled to said watch wherein said speaker is configured to emit audible sound outwardly therefrom, said speaker being electrically coupled to said processor.

8. The system according to claim 1, further comprising a power supply being coupled to said watch, said power supply being electrically coupled to said processor.

9. The system according to claim 8, wherein said power supply comprises at least one battery being positioned within said watch, said at least one battery being electrically coupled to said processor.

10. The system according to claim 9, further comprising a wireless charger being positioned within said watch wherein said wireless charger is configured to be in wireless electrical communication with a power source, said wireless charger being electrically coupled to said at least one battery to charge said at least one battery.

11. The system according to claim 9, further comprising a plurality of solar cells, each of said solar cells being coupled to said watch wherein each of said solar cells is configured to be exposed to sunlight, each of said solar cells being electrically coupled to said at least one battery to charge said at least one battery, each of said solar cells being positioned along a lateral side of said watch such that said solar cells are perpendicular to said planar surface of said display.

12. The system according to claim 9, further comprising a charge port being coupled to said watch wherein said charge port is configured to be electrically coupled to a power source, said charge port being electrically coupled to said at least one battery to charge said at least one battery.

13. A remote vehicle control system comprising:

a vehicle having a diagnostic system, electric door locks, an electric trunk release, a theft alarm and a first transceiver;

a watch being configured to be worn on a wrist thereby facilitating said watch to display a time of day and a date, said watch having a top side, a bottom side and a peripheral edge extending therebetween, said peripheral edge having a front side and a back side, said front side having a pair of first tabs extending outwardly therefrom, said first tabs being spaced apart from each other, said back side having a pair of second tabs extending outwardly therefrom said second tabs being spaced apart from each other, each of said first tabs being configured to engage a first end of a wrist band, each of said second tabs being configured to engage a second end of a wrist band thereby facilitating the wrist band to retain said watch on the wrist;

a communication unit being coupled to said watch, said communication unit being in electrical communication with said diagnostic unit wherein said communication unit is configured to notify a user of diagnostic alerts generated by said diagnostic unit, said communication unit controlling operational parameters of said electric door locks, said electric trunk release and said theft alarm, said communication unit comprising:

a processor being positioned within said watch, an electronic timer being positioned within said watch, said electronic timer being electrically coupled to said processor, said electronic timer tracking a time of day and a calendar date, a second transceiver being positioned within said watch, said second transceiver being electrically coupled to said processor, said second transceiver being in electrical communication with said first transceiver, a display being coupled to said top side of said watch wherein said display is configured to be visible to the user, said display being electrically coupled to said processor, said display displaying indicia corresponding to the diagnostic alerts received from said diagnostic unit, said display displaying indicia corresponding to the time of day and the calendar date from said electronic timer said display being rectangular having a planar surface with four corners, a plurality of buttons, each of said buttons being movably coupled to said watch and positioned on said display adjacent to a respective one of said corners, each of said buttons being electrically coupled to said processor, said plurality of buttons including a door unlock button, a door lock button, a trunk release button and an alarm button, said electric door locks unlocking when said door unlock button is depressed, said electric door locks locking when said door lock button is depressed, said electric trunk release being actuated when said trunk release button is depressed, said theft alarm being turned on when said alarm button is depressed, a microphone being coupled to said watch wherein said microphone is configured to record audible sounds, said microphone being electrically coupled to said processor such that said processor responds to verbal commands, a speaker being coupled to said watch wherein said speaker is configured to emit audible sound outwardly therefrom, said speaker being electrically coupled to said processor, and a power supply being coupled to said watch, said power supply being electrically coupled to said processor, said power supply comprising:

at least one battery being positioned within said watch, said at least one battery being electrically coupled to said processor, a wireless charger being positioned within said watch wherein said wireless charger is configured to be in wireless electrical communication with a power source, said wireless charger being electrically coupled to said at least one battery to charge said at least one battery, a plurality of solar cells, each of said solar cells being coupled to said watch wherein each of said solar cells is configured to be exposed to sunlight, each of said solar cells being electrically coupled to said at least one battery to charge said at least one battery, each of said solar cells being positioned along a lateral side of said watch such that said solar cells are perpendicular to said planar surface of said display, and a charge port being coupled to said watch wherein said charge port is configured to be electrically coupled to a power source, said charge port being electrically coupled to said at least one battery to charge said at least one battery.

\* \* \* \* \*